United States Patent
Beinenz et al.

(10) Patent No.: US 12,078,422 B2
(45) Date of Patent: Sep. 3, 2024

(54) DEVICE, SYSTEM AND METHOD FOR SEPARATING TRANSPORT BOATS

(71) Applicant: ALD Vacuum Technologies GmbH, Hanau (DE)

(72) Inventors: Frank Beinenz, Hanau (DE); Sven Herdler, Mombris (DE); Johannes Fachinger, Altenstadt (DE)

(73) Assignee: ALD VACUUM TECHNOLOGIES GMBH, Hanau (DE)

( * ) Notice: Subject to any disclaimer, the term of this patent is extended or adjusted under 35 U.S.C. 154(b) by 614 days.

(21) Appl. No.: 17/425,320

(22) PCT Filed: Jan. 21, 2020

(86) PCT No.: PCT/EP2020/051380
§ 371 (c)(1),
(2) Date: Jul. 23, 2021

(87) PCT Pub. No.: WO2020/156881
PCT Pub. Date: Aug. 6, 2020

(65) Prior Publication Data
US 2022/0082328 A1    Mar. 17, 2022

(30) Foreign Application Priority Data
Feb. 1, 2019 (DE) .................... 10 2019 102 591.5

(51) Int. Cl.
*F27B 9/20* (2006.01)
*F27B 9/04* (2006.01)
*F27D 3/12* (2006.01)

(52) U.S. Cl.
CPC ............... *F27D 3/12* (2013.01); *F27B 9/042* (2013.01); *F27D 2003/124* (2013.01)

(58) Field of Classification Search
CPC .. F27B 9/042; F27B 9/262; F27B 9/14; F27B 2009/268; F27D 3/12; F27D 3/123; F27D 2003/124
See application file for complete search history.

(56) References Cited

U.S. PATENT DOCUMENTS

| 3,038,712 A | 6/1962 | Nagel et al. |
| 2010/0044892 A1 | 2/2010 | Pages |

FOREIGN PATENT DOCUMENTS

KR    20100073306 A  *  7/2010

OTHER PUBLICATIONS

Int'l Preiminary Report on Patentability issued Jul. 27, 2021 in Int'l Application No. PCT/EP2020/051380.
(Continued)

*Primary Examiner* — Gregory A Wilson
(74) *Attorney, Agent, or Firm* — Panitch Schwarze Belisario & Nadel LLP

(57) ABSTRACT

A device for separating interconnected transport boats that are movable in a first plane in an intended direction of motion includes a substantially oval, non-circular separation disk aligned parallel to the first plane and connected to a rotary drive and a lifting device via a drive shaft. The separation disk is movable by means of the lifting device in the direction of the transport boats to be separated in order to engage with a corresponding total recess in the transport boats to be separated. In addition, the separation disk is rotatably movable in, and/or parallel to, the first plane by means of the rotary drive in order to separate the transport boats to be separated from each other by rotating the separation disk.

11 Claims, 1 Drawing Sheet

(56) References Cited

OTHER PUBLICATIONS

Int'l Search Report and Written Opinion issued Mar. 27, 2020 in Int'l Application No. PCT/EP2020/051380, translation of Int'l Search Report only.

* cited by examiner

DEVICE, SYSTEM AND METHOD FOR SEPARATING TRANSPORT BOATS

CROSS-REFERENCE TO RELATED APPLICATIONS

This application is a Section 371 of International Application No. PCT/EP2020/051380, filed Jan. 21, 2020, which was published in the German language on Aug. 6, 2020, under International Publication No. WO 2020/156881 A1, which claims priority under 35 U.S.C. § 119(b) to German Application No. 10 2019 102 591.5, filed Feb. 1, 2019, the disclosures of each of which are incorporated herein by reference in their entireties.

BACKGROUND OF THE INVENTION

The present invention relates to a device, a system and a method for separating interconnected transport boats which are caked or adhere to each other, in particular by pressure. Transport boats in the sense of the present invention may be referred to in English as "sintering shoes" and, according to the present disclosure, also comprise transport plates or workpiece carriers used in various technical applications.

Transport boats, transport plates or workpiece carriers are used in a variety of technical fields for transporting cargo.

For example, transport boats to be separated are used in the production of nuclear fuel elements for transporting MOX pellets (mixed oxide pellets) in sintering furnaces. The transport boats are loaded with fuel powder pressed into MOX pellets in order to transfer these MOX pellets to a sintering furnace by means of the transport boats. In the sintering furnace, the MOX pellets are then sintered at temperatures of 200° C. to 2000° C. and a pressure of between 80 kPa and 120 kPa and then transported further by the transport boats for subsequent unloading of the transport boats.

In this process, a large number of transport boats are lined up in practice, with a front end face of each transport boat being in contact with a rear end face of an adjacent transport boat as viewed in the direction of motion. The plurality of transport boats is moved together in an intended direction of motion. Since the transport boats are also in the sintering furnace during sintering of the MOX pellets thereon, adjacent transport boats are interconnected by sintering at the contact surfaces between the adjacent transport boats. In otherwords, adjacent transport boats are caked together at the end faces facing each other.

However, this tight bonding or caking of the transport boats is an undesirable effect. In order to better handle the transport boats after they leave the sintering furnace, they must be separated from each other again.

For this purpose, document US 2010/0044892 A1 proposes a device for separating transport boats, comprising a separation component that acts on the transport boats in a direction orthogonal to the direction of motion of the transport boats, thereby separating them. More specifically, document US 2010/0044892 A1 teaches an eccentric element that applies a force upward from below in the vertical direction to the contact region of the interconnected transport boats that are movable in the horizontal direction. This raises the transport boats at least in sections. However, such lifting can lead to hazards, since MOX pellets arranged on the transport boats can slip and/or fall off the transport boats.

In order to limit lifting and at least reduce the associated hazards, document US 2010/0044892 A1 proposes to provide the device with a plurality of hold-downs in one embodiment. These hold-downs are arranged to each hold down an end of a transport boat opposite to a lifted end. However, these hold-downs represent additional components to be integrated in the device, which increases the complexity of the structure.

It is therefore an object of the present invention to overcome the disadvantages inherent in the prior art. In particular, one task of the invention is to provide a device, a system, an associated transport boat and a method that enable safe separating of the transport boats without increasing the complexity of the overall setup.

The tasks are solved by a device, a system, a transport boat and a method according to the independent claims. Improvements and embodiments of the device, the system, the transport boat and the method are the subject of the dependent claims and the description below.

DESCRIPTION OF THE INVENTION

One aspect of the invention relates to a device intended for separating interconnected transport boats that are movable in a first plane in an intended direction of motion. The device comprises a substantially oval non-circular separation disk aligned parallel to the first plane and connected to a rotary drive and a lifting device via a drive shaft. Aligned parallel to the first plane means that the oval (but non-circular) separation disk may extend in the first plane or a parallel second plane spaced therefrom, depending on its position and orientation. The separation disk is movable by means of the lifting device in the direction of the transport boats to be separated in order to engage with a corresponding total recess in the transport boats to be separated or to be inserted into the total recess. More precisely, the separation disk is movable by means of the lifting device along an axis substantially orthogonal to the transport boats and to the direction of motion thereof via the drive shaft in the direction of the transport boats to be separated and away from them, back to a starting position. The corresponding total recess in the transport boats to be separated extends across both transport boats, i.e. the total recess comprises a region in which an end face or contact face of the two transport boats lies. Thus, the total recess comprises two partial recesses, one partial recess being formed in each of two interconnected transport boats. Furthermore, the separation disk is rotatable by means of the rotary drive about an axis of rotation or about the axis of rotation of the drive shaft in and/or parallel to the first plane in order to separate the transport boats to be separated from each other by rotating the separation disk. Rotating the oval, non-circular separation disk causes force to be applied within the first plane to opposing boundary surfaces of the total recess, i.e., to one boundary surface of a partial recess in each case. In other words, the torque generated by the rotary drive is converted via the separation disk into forces which, by means of at least punctual or planar contact of the separation disk with the opposing boundary surfaces of the total recess, press the transport boats apart and thus release their connection.

Since the force separating the transport boats acts only in the first plane, which is usually a horizontal plane, the transport boats to be separated are not lifted during separation. This reduces the risk of losing cargo. At the same time, thanks to the device according to the invention, additional hold-down devices can be dispensed with, which reduces the complexity of the overall structure of the device.

The substantially oval separation disk describes a flat round convex figure, which in the broadest sense resembles the profile of a bird's egg. However, the separation disk of the present invention is non-circular, meaning that the separation disk has at least two different widths A and B, with width B being greater than width A. Width A is less than the recess length of the total recess considered in the direction of motion, while width B is greater than this recess length. Both widths A and B of the separation letter are less than the recess width of the total recess viewed transversely to the direction of motion. This embodiment allows the separation disk to be inserted into the total recess by a vertical lifting movement by means of the lifting device, with the separation disk in a position in which the separation disk does not contact any of the boundary surfaces of the total recess during insertion. In this position, the width B may extend substantially transverse to the direction of motion of the transport boats, while the width A may extend substantially in the direction of motion. Subsequent rotation of the separation disk by means of the rotary drive about the axis of rotation of the drive shaft can rotate the width B substantially in the direction of motion so that the separation disk contacts boundary surfaces of the total recess which are opposite to each other as viewed in the direction of motion. Since the width B is greater than the recess length of the total recess, the rotary motion of the separation disk applies a force in the horizontal direction to the transport boats to be separated. More specifically, opposite forces are applied to the opposing boundary surfaces of the total recess, causing separation of the interconnected transport boats.

In particular, the substantially oval non-circular separation disk may have an elliptical shape or a spiral shape. Alternatively, the separation disk may have a non-symmetrical oval shape (any oval). A circular shape with a protrusion is also conceivable and is considered substantially oval and non-circular, since the separation disk has two different widths due to the protrusion. The exact shape of the separation disk can be chosen with respect to the total recess in the transport boats to be separated and/or the other way around.

For example, a spiral-shaped separation disk may be shaped as an Archimedean, logarithmic or Fermatian spiral. A spiral-shaped separation disk has the advantage that the radius increases continuously in a defined manner as a function of the angle of rotation. Taking this knowledge into account, a targeted and very precise separation of the transport bots can be carried out in particular when the separation disk is rotated by means of a servomotor with incremental encoder.

In one embodiment of the device, the substantially oval non-circular separation disk may be force-fitted to the drive shaft. In particular, the separation disk may be attached to an upper end section of the drive shaft. Alternatively or additionally, a form-fitting and/or material-fitting attachment of the separation disk to the drive shaft may be provided.

In a further embodiment, the device according to the invention may comprise a partition wall intended to separate a region subjected to vacuum from a region subjected to ambient pressure. In this further embodiment, the drive shaft is guided in a sealed manner through a bushing formed in the partition wall. The bushing is thus a rotary lift bushing. The partition wall thus represents an interface between the region subjected to ambient pressure and the region subjected to vacuum, in which the transport boats are arranged. The partition wall makes it possible to arrange part of the device in the region subjected to ambient pressure. In particular, the rotary drive and the lifting device can be intended to be located in the region subjected to ambient pressure. This facilitates maintenance work, since no intervention is required in the region subjected to vacuum.

In one embodiment, the rotary output drive of the device can be arranged laterally to the drive shaft and designed to rotate it about its axis of rotation. This enables a space-saving overall design of the device. The lifting device can be arranged below the drive shaft at its lower end section. The lower end section of the drive shaft is opposite to the upper end section of the drive shaft.

The invention further relates to a system for separating interconnected transport boats. The system comprises at least two transport boats, which are movable in a first plane in an intended direction of motion. The at least two transport boats are interconnected via end faces of the transport boats facing each other. A fixed connection of the at least two transport boats may, for example, have been previously generated by pressure and temperature during a sintering process, i.e. the at least two transport boats may be caked at the end faces facing each other. On each of the at least two transport boats, a partial recess is formed in the region of the end faces facing each other in such a way that, in the interconnected state of the at least two transport boats, the partial recesses are aligned with one another and together form a total recess. The system further comprises a device of the type described above, with the substantially oval non-circular separation disk extending parallel to the first plane and connected to the rotary drive and the lifting device via the drive shaft. The separation disk is movable by means of the lifting device in the direction of the at least two transport boats to engage the total recess in the at least two transport boats. Further, the separation disk is rotatably movable in the first plane by means of the rotary drive to separate the at least two transport boats from each other by rotating the separation disk.

For example, the total recess may have a rectangular shape, and each of the two partial recesses forming the total recess may also have a rectangular shape by itself. Preferably, the total recess or the two partial recesses may extend across the entire thickness of the transport boats. Alternatively, the total recess or the two partial recesses may have a smaller thickness than the transport boats. In this case, the total recess is only accessible from below and is not visible in a top view of the transport boats. Viewed in the direction of motion, the total recess has a recess length that is the sum of the lengths of the two partial recesses. Further, total recess has a recess width as viewed transversely to the direction of motion, which may correspond to the width of each of the two partial recesses.

The separation disk has at least a first width A that is less than the recess length, and at least a second width B that is greater than the recess length. Both widths A and B are less than the recess width. The vertical lifting movement by means of the lifting device allows the separation disk to be inserted into the total recess, the separation disk being in a position in which the separation disk does not contact any of the boundary surfaces of the total recess during insertion. In this position, the width B may extend substantially transverse to the direction of motion of the transport boats, while the width A may extend substantially in the direction of motion. Subsequent rotation of the separation disk by means of the rotary drive about the axis of rotation of the drive shaft can rotate the width B substantially in the direction of motion so that the separation disk contacts boundary surfaces of the total recess which are opposite to each other as viewed in the direction of motion. Since the width B is greater than the recess length of the total recess, the rotary motion of the separation disk applies a force in the horizontal direction to the transport boats to be separated. More precisely, opposite forces are applied to the opposing boundary surfaces of the total recess, causing the interconnected transport boats to separate. Depending on the specific design of the separation disk, for example, the preceding transport boat considered in the direction of motion can be pushed in the direction of motion by the separation disk, while the following transport boat is held back, i.e. remains in its position.

It is understood that more than two interconnected transport boats may be intended in the system. Each of the transport boats may have two partial recesses, each of which may be formed in the region of opposite end faces of the respective transport boat. Thus, each of the transport boats may respectively form a total recess together with a transport boat located behind the transport boat as viewed in the direction of motion, and may respectively form another total recess together with a transport boat located in front of the transport boat as viewed in the direction of motion.

In a further embodiment of the system, the device may comprise a partition wall separating a region subjected to vacuum from a region subjected to ambient pressure. The drive shaft is guided in a sealed manner through a rotary lift bushing formed in the partition wall. In this further embodiment, the at least two transport boats and the separation disk are arranged in the region subjected to vacuum, while the rotary drive and the lifting device are arranged in the region subjected to ambient pressure.

Another aspect of the invention relates to a transport boat for a system of the type described above. The transport boat is movable in a first plane in an intended direction of motion. At opposite ends, the transport boat comprises an end face each intended for contacting an opposite end face of an adjacent transport boat. In the region of the end face of the transport boat, a partial recess is formed which is adapted to receive a portion of a separation disk. For this purpose, the partial recess can be designed to be open to the outside. That is, the partial recess can extend from the end face in the direction of the center of the transport boat.

The partial recess can have a rectangular shape, for example. In one embodiment, the partial recess may extend across the entire thickness of the transport boat. Alternatively, the partial recess may extend over only a portion of the thickness of the transport boat, such as two-thirds, one-half, or one-third of the thickness of the transport boat. In this case, the total recess is accessible only from below and is not visible in a top view of the transport boat. The shape and dimensions of the partial recess can be selected according to the shape and dimensions of an associated partial recess of a transport boat adjacent in operation and/or according to the shape and dimensions of a corresponding separation disk.

The transport boat can have a further partial recess formed in the region of an opposite end face of the transport boat. Thus, two partial recesses can be formed in the transport boat. Thus, the transport boats may form a total recess each together with a transport boat located behind the transport boat as viewed in the direction of motion, and may each form a further total recess together with a transport boat located in front of the transport boat as viewed in the direction of motion.

The invention further relates to a method for separating interconnected transport boats that are movable in a first plane in an intended direction of motion. In particular, the method may be carried out by means of a device of the type described above. The method comprises the steps of:

Moving a substantially oval, non-circular separation disk by means of a lifting device in the direction of the transport boats to be separated, the separation disk being aligned parallel to the first plane;

inserting the separation disk into a corresponding total recess in the transport boats to be separated, in particular by moving as described above; and rotating the separation disk engaging the total recess by means of a rotary drive in and/or parallel to the first plane to separate the transport boats to be separated from each other by rotating the separation disk.

The method may further comprise, prior to moving the separation disk in the direction of the transport boats to be separated, the step of: Positioning the transport boats to be separated such that the total recess in the transport boats is aligned with the separation disk.

Preferably, the line may be orthogonal to the intended direction of motion of the transport boats so that the separation disk can be easily inserted into the recess by the lifting motion.

The method may further comprise steps of turning back and moving back the separation disk to an initial position, which are performed after separating the transport boats to be separated.

Subsequently, the steps of the method may be repeated to separate additional transport boats to be separated from each other.

Although some aspects and features are described above and below only with respect to the device for separating interconnected transport boats, these aspects and features may apply mutatis mutandis to the system, transport boat, and/or method for separating interconnected transport boats, and vice versa.

BRIEF DESCRIPTION OF THE FIGURES

Embodiment examples of the present invention are described in more detail below with reference to the accompanying schematic figures. They represent.

FIGURE DESCRIPTION

Identical reference signs in the figures indicate identical or analogous elements.

Figure 1:
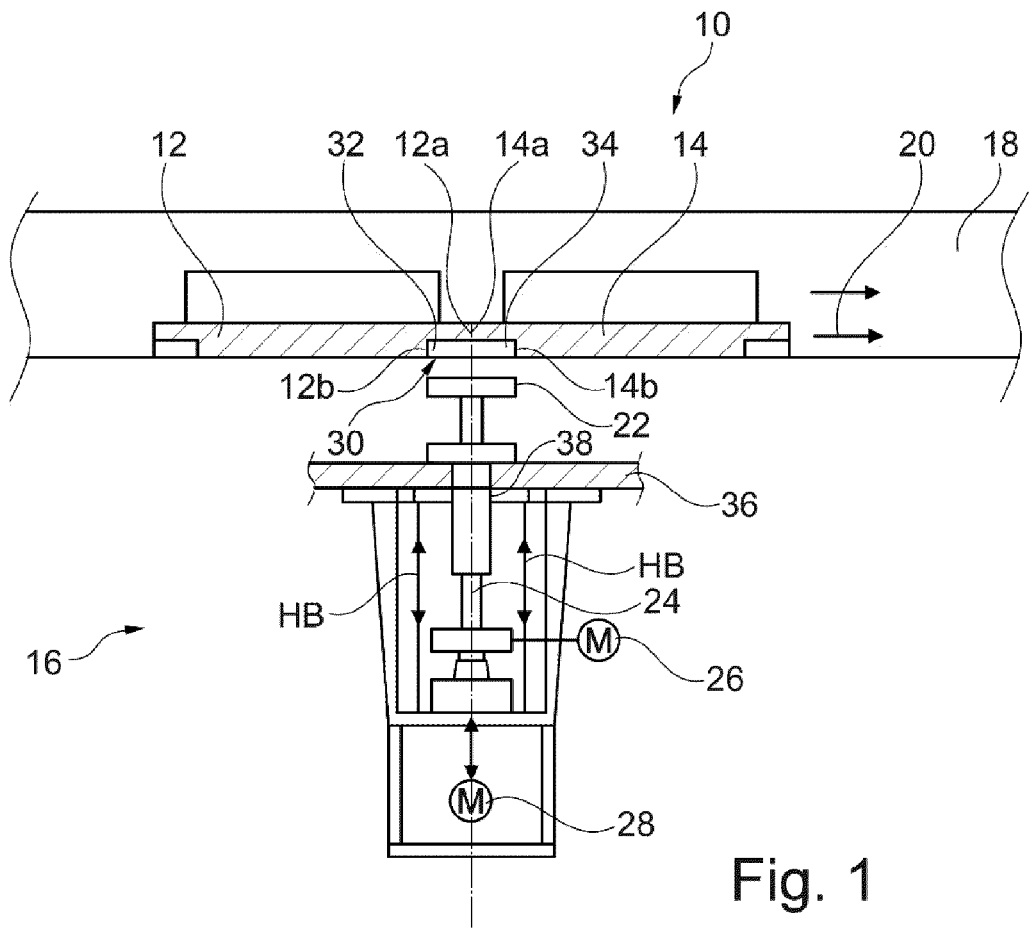
FIG. 1 a side sectional view of a system for separating interconnected transport boats according to an embodiment example.
Figure 2:
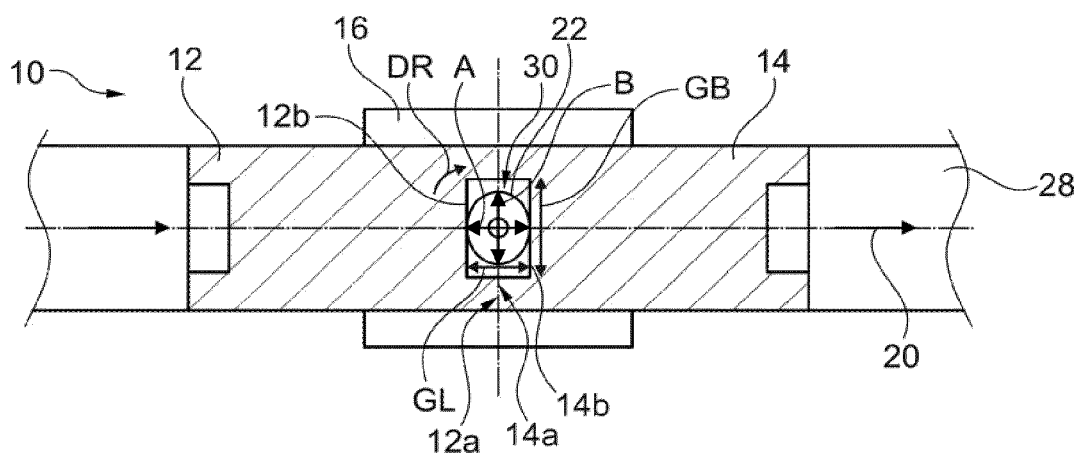
FIG. 2 a top view of a sectional view of the system according to the embodiment example of FIG. 1.

FIGS. 1 and 2 show an exemplary embodiment of the system 10 according to the invention. FIG. 1 shows a side sectional view of the embodiment example, while FIG. 2 shows a top view of a sectional view. The system 10 comprises two interconnected transport boats 12, 14 and a device 16 for separating transport boats to be separated (in this case for separating the transport boats 12, 14).

In the embodiment shown, the planar transport boats 12, 14 are arranged in a tunnel 18 and are displaceable in a direction of motion 20 within this tunnel 18. The transport boats 12, 14 are each loaded with already sintered MOX pellets. As a result of the sintering process, the transport boats 12, 14 are caked at end faces 12a, 14a facing each other. However, the resulting tight connection of the transport boats 12, 14 is undesirable and is to be released with the aid of the device 16.

The device 16 according to the invention comprising a substantially oval, non-circular separation disk 22, the extension of which is parallel to the transport boats 12, 14. The separation disk 22 is connected via a drive shaft 24 to a rotary drive 26 and a lifting device 28 of the device 16. While the rotary drive 26 is located laterally of the drive shaft 24, the lifting device 28 is located at the lower end and in line with the drive shaft 24.

The device 16 is arranged below the tunnel 18, i.e. below the transport boats 12, 14. In the condition shown in FIG. 1, the two transport boats 12, 14 to be separated are positioned such that a total recess 30 formed by the two transport boats 12, 14 is located just above the separation disk 22 when viewed along the axis of the drive shaft 24.

In the embodiment shown, the total recess 30 has a rectangular shape (see FIG. 2) and is composed of two partial recesses 32, 34, one partial recess 32, 34 being formed in each of the two interconnected transport boats 12, 14. Each of the partial recesses 32, 34 extends from an end face 12a, 14a of the associated transport boats 12 and 14, respectively, in the direction of the center of this transport boat 12, 14. The total recess 30 formed by the two partial recesses 32, 34 has a recess length GL as viewed in the direction of motion 20 and a recess width GB transversely to the direction of motion 20, the recess length GL being composed of the lengths of the two partial recesses 32, 34 and the recess width GB corresponding to the respective width of the partial recesses 32, 34. In the embodiment shown, the total recess 30 has a smaller thickness than the transport boats 12, 14, i.e., the total recess 30 is accessible only from below and is not visible in an uncropped top view of the transport boats 12, 14 (not shown here).

The separation disk 22 is movable by means of the lifting device 28 in the direction of the transport boats 12, 14 to be separated (arrows HB) in order to engage with the corresponding total recess 30 or to be inserted into this total recess 30 by the lifting movement. Further, the separation disk 22 is rotatably movable about the axis of the drive shaft 24 by means of the rotary drive 26.

In the example shown, the separation disk 22 has a symmetrical oval shape having, among other things, two different widths A and B. The width B is greater than the width A. The width A of the separation disk 22 is less than the recess length GL of the total recess 30 as viewed in the direction of motion 20. The width B of the separation disk 22 is greater than this recess length GL. Both widths A and B of the separation disk 22 are smaller than the recess width GB of the total recess 30. These ratios and dimensions can be detected in particular from FIG. 2.

During the vertical lifting movement of the separation disk 22 for inserting the separation disk 22 into the total recess 30, the separation disk 22 is in a position in which it does not contact any of the boundary surfaces of the total recess 30 during inserting (neither in longitudinal direction nor in transverse direction to the direction of motion 20 considered).

By rotating the separation disk 22 by means of the rotary drive 26 about the axis of rotation of the drive shaft 24 following the inserting, the separation disk 22 can be rotated in the direction of motion 20 such that the width B of the separation disk 22 is substantially arranged in the direction of motion 20. This rotating is indicated in FIG. 2 by the arrow DR. As a result, the separation disk 22 comes into contact, at least selectively or over a large region, with boundary surfaces 12b, 14b of the total recess 30 that are opposite one another as viewed in the direction of motion 20, i.e. with a boundary surface 12b belonging to the transport boat 12 and a boundary surface 14b belonging to the transport boat 14. Since the width B of the separation disk 22 is greater than the recess length GL of the total recess 30, the described rotating of the separation disk 22 applies opposite forces in the horizontal direction across the boundary surfaces 12b, 14b to the transport boats 12, 14 to be separated. More specifically, these opposite forces act in or against the direction of motion 20 on the opposing boundary surfaces 12b, 14b of the total recess 30 to cause intended separating of the interconnected transport boats 12, 14.

The device 16 comprises a partition wall 36 intended to separate a region subjected to vacuum from a region subjected to ambient pressure. As can be seen in FIG. 1, the tunnel 18, the transport boats 12, 14 located therein and the separation disk 22 are arranged in the region subjected to vacuum. In the region exposed to ambient air, the rotary drive 26 and the lifting device 28 are arranged. In order to realize this arrangement of the components of the device 16 in different regions, a bushing 38 is formed in the partition wall 36, through which the drive shaft 24 of the device 16 is guided in a sealed manner. The bushing 38 is thus a rotary lift bushing which permits both a rotating movement and a lifting movement of the drive shaft 24, and yet seals off the region subjected to vacuum from the region subjected to ambient pressure in a pressure-tight manner.

LIST OF REFERENCE SIGNS 10 system
12 transport boat
12a end face of transport boat 12
12b boundary surface of the partial recess 32
14 transport boat
14a end face of the transport boat 14
14b boundary surface of the partial recess 34
16 device
18 tunnel
20 direction of motion
22 separation disk
A smaller width of separation disk 22
B larger width of separation disk 22
24 drive shaft
26 rotary drive
28 lifting device
30 total recess
32 partial recess of transport boat 12
34 partial recess of transport boat 14
36 partition wall
38 rotating lift bushing
GL recess length of total recess 30
GB recess width of total recess 30
HB direction of lifting motion
DR direction of rotary motion

The invention claimed is:

1. A device (16) for separating interconnected transport boats (12, 14) movable in a first plane in an intended direction of motion (20), comprising:
   a substantially oval, non-circular separation disk (22) aligned parallel to the first plane and connected to a rotary drive (26) and a lifting device (28) via a drive shaft (24),
   wherein the separation disk (22) is movable by means of the lifting device (28) in the direction of the transport boats (12, 14) to be separated in order to engage with a corresponding total recess (30) in the transport boats (12, 14) to be separated, and
   wherein the separation disk (22) is rotatably movable in and/or parallel to the first plane by means of the rotary drive (26) to separate the transport boats (12, 14) to be separated from each other by rotating the separation disk (22).

2. The device (16) according to claim 1, wherein the substantially oval non-circular separation disk (22) has an elliptical shape or a spiral shape.

3. The device (16) according to claim 1, wherein the substantially oval, non-circular separation disk (22) is force-fitted to the drive shaft (24).

4. The device (16) according to claim 1, further comprising a partition wall (36) intended to separate a region subjected to vacuum from a region subjected to ambient pressure, wherein the drive shaft (24) is guided in a sealed manner through a bushing (38) formed in the partition wall (36).

5. The device (16) according to claim 1, wherein the rotary drive (26) is arranged laterally to the drive shaft (24).

6. A system (10) for separating interconnected transport boats (12, 14), the system (10) comprising:
- at least two transport boats (12, 14), which are movable in a first plane in an intended direction of motion (20) and which are interconnected via end faces (12a, 14a) of the transport boats (12, 14) facing one another, wherein on each of the at least two transport boats (12, 14) in the region of the end faces (12a, 14a) facing one another, a partial recess (32, 34) is formed in such a way that, in the interconnected state of the at least two transport boats (12, 14), the partial recesses (32, 34) are aligned with one another and together form a total recess (30);
- a device (16) according to claim 1, comprising the substantially oval, non-circular separation disk (22) extending parallel to the first plane and connected to the rotary drive (26) and the lifting device (28) via the drive shaft (24),
- wherein the separation disk (22) is movable by means of the lifting device (28) in the direction of the at least two transport boats (12, 14) to engage the total recess (30) in the at least two transport boats (12, 14), and
- wherein the separation disk (22) is rotatably movable in the first plane by means of the rotary drive (26) to separate the at least two transport boats (12, 14) from each other by rotating the separation disk (22).

7. The system (10) of claim 6, wherein the device (16) further comprises a partition wall (36) separating a region subjected to vacuum from a region subjected to ambient pressure, wherein the drive shaft (24) is guided in a sealed manner through a bushing (38) formed in the partition wall (36) and wherein the at least two transport boats (12, 14) and the separation disk (22) are arranged in the region subjected to vacuum, while the rotary drive (26) and the lifting device (28) are arranged in the region subjected to ambient pressure.

8. A transport boat (12) for the system (10) according to claim 6, which is movable in a first plane in an intended direction of motion (20),
- wherein the transport boat (12) comprises at opposite ends each an end face (12a) intended for contacting an opposite end face (14a) of an adjacent transport boat (14), and
- wherein a partial recess (32) adapted to receive a portion of a separation disk (22) is formed in the region of the end face (12a) of the transport boats (12).

9. A method for separating interconnected transport boats (12, 14) movable in a first plane in an intended direction of motion (20), comprising the steps of:
- moving a substantially oval, non-circular separation disk (22) by means of a lifting device (28) in the direction of the transport boats (12, 14) to be separated, the separation disk (22) being aligned parallel to the first plane,
- inserting the separation disk (22) into a corresponding total recess (30) in the transport boats (12, 14) to be separated, and
- rotating the separation disk (22) by means of a rotary drive (26) in and/or parallel to the first plane to separate the transport boats (12, 14) to be separated from each other by rotating the separation disk (22).

10. The method according to claim 9, further comprising the step of:
- positioning the transport boats (12, 14) to be separated such that the total recess (30) in the transport boats (12, 14) is aligned in a line with the separation disk (22).

11. The method of claim 10, wherein the line is orthogonal to the intended direction of motion (20) of the transport boats (12, 14).

* * * * *